United States Patent
Wigren

(10) Patent No.: US 7,912,461 B2
(45) Date of Patent: *Mar. 22, 2011

(54) COMPLEXITY REDUCTION IN POWER ESTIMATION

(75) Inventor: Karl Torbjorn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 549 days.

This patent is subject to a terminal disclaimer.

(21) Appl. No.: 12/091,833

(22) PCT Filed: Nov. 11, 2005

(86) PCT No.: PCT/SE2005/001714
§ 371 (c)(1),
(2), (4) Date: Apr. 28, 2008

(87) PCT Pub. No.: WO2007/055626
PCT Pub. Date: May 18, 2007

(65) Prior Publication Data
US 2008/0254788 A1     Oct. 16, 2008

(51) Int. Cl.
*H04W 24/00*     (2009.01)
*H04L 12/26*     (2006.01)

(52) U.S. Cl. .......................... 455/423; 370/242

(58) Field of Classification Search ............ 455/423, 455/143, 452.1, 296, 562, 63.1, 67.11, 436, 455/62, 431, 52.3, 522; 370/330, 252, 347, 370/337, 345, 242, 321, 328, 335, 468; 701/216, 701/207, 85, 300, 224, 221, 220; 702/150, 702/151, 190, 95, 94, 92, 85, 17, 70, 93, 300, 34, 207

See application file for complete search history.

(56) References Cited

U.S. PATENT DOCUMENTS

| | | | |
|---|---|---|---|
| 5,581,580 A * | 12/1996 | Lindbom et al. | 375/340 |
| 6,363,053 B1 * | 3/2002 | Schuster et al. | 370/230 |
| 6,385,454 B1 * | 5/2002 | Bahl et al. | 455/450 |
| 6,697,436 B1 * | 2/2004 | Wright et al. | 375/296 |
| 6,697,633 B1 * | 2/2004 | Dogan et al. | 455/509 |
| 6,785,513 B1 * | 8/2004 | Sivaprakasam | 455/63.1 |
| 7,072,693 B2 * | 7/2006 | Farlow et al. | 455/562.1 |
| 7,076,380 B2 * | 7/2006 | Michel | 702/75 |
| 7,110,722 B2 * | 9/2006 | Godsill et al. | 455/67.13 |
| 7,197,282 B2 * | 3/2007 | Dent et al. | 455/67.14 |

(Continued)

FOREIGN PATENT DOCUMENTS

EP       0936753 A2    8/1999

OTHER PUBLICATIONS

Söderstrom, Discrete Time Stochastic Systems. London, UK: Springer, 2002, pp. 12-14, 123-126, 142, 149-150, 247.

*Primary Examiner* — Melody Mehrpour
(74) *Attorney, Agent, or Firm* — Roger S. Burleigh

(57) ABSTRACT

A signal-power related quantity is estimated by repeating a processing step, where measured values of instantaneous signal powers are processed. At each relevant part step of the processing and for each relevant matrix (99), elements (98) that are indicated to be negligibly small are changed to instead be exactly equal to zero. The computational complexity can thereby be decreased considerably. The principles are applied on determination of signal-power related quantities in wireless communications systems.

32 Claims, 4 Drawing Sheets

U.S. PATENT DOCUMENTS

| | | | |
|---|---|---|---|
| 7,453,861 B2 * | 11/2008 | Leung et al. | 370/342 |
| 7,697,495 B2 * | 4/2010 | Armstrong et al. | 370/338 |
| 7,856,243 B2 * | 12/2010 | Gunnarsson et al. | 455/522 |
| 2002/0187765 A1 * | 12/2002 | Kozak et al. | 455/232.1 |
| 2003/0036359 A1 * | 2/2003 | Dent et al. | 455/63 |
| 2003/0229445 A1 * | 12/2003 | Tingley | 701/207 |
| 2004/0014445 A1 * | 1/2004 | Godsill et al. | 455/226.1 |
| 2004/0022207 A1 * | 2/2004 | Leung et al. | 370/321 |
| 2005/0101264 A1 * | 5/2005 | Farlow et al. | 455/84 |
| 2006/0146759 A1 * | 7/2006 | Guo et al. | 370/335 |
| 2006/0164978 A1 * | 7/2006 | Werner et al. | 370/229 |
| 2006/0183430 A1 * | 8/2006 | Godsill et al. | 455/67.13 |
| 2007/0087756 A1 * | 4/2007 | Hoffberg | 455/450 |
| 2007/0099633 A1 * | 5/2007 | Bamberger et al. | 455/456.2 |
| 2009/0010242 A1 * | 1/2009 | Leung et al. | 370/345 |

\* cited by examiner

Fig. 3A
Fig. 3B
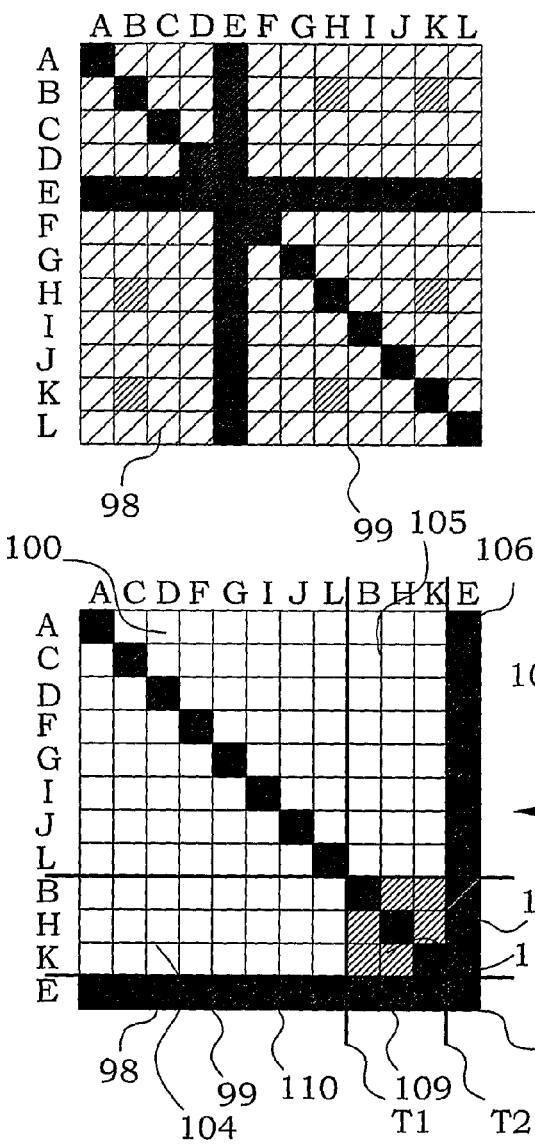
Fig. 3D
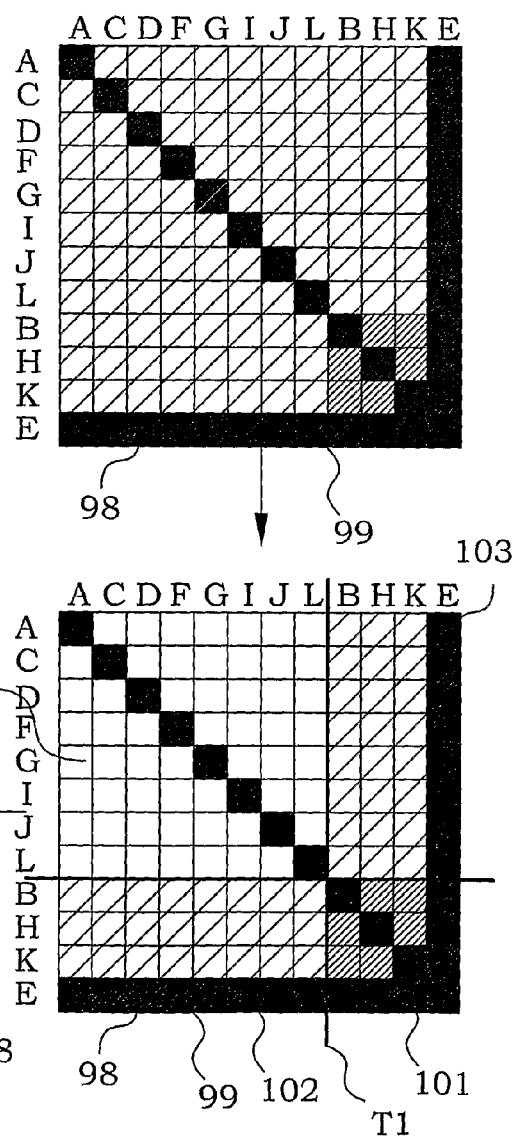
Fig. 3C

COMPLEXITY REDUCTION IN POWER ESTIMATION

TECHNICAL FIELD

The present invention relates in general to wireless communications networks, and in particular to estimation of power related quantities in cellular communications networks.

BACKGROUND

In wireless communications networks, radio signals are transmitted from different antennas. The geographical distribution of the antennas, and the frequencies and power at which the signals are transmitted determine how much the different signals interfere with each other. In order to enabling good signal quality and high transfer bit rates, different power related quantities are measured and/or estimated in wireless communications networks of today.

One example is the functionality regarding enhanced uplink (E-UL) in WCDMA type cellular systems. A specific technical challenge is the scheduling of enhanced uplink channels to time intervals where the interference conditions are favourable, and where there exists a sufficient capacity in the uplink of the cell in question, for support of enhanced uplink channels. In order to avoid uncontrolled rise of the interference levels and thereby of the transmission powers, one has to keep track of the noise rise level. Such a noise rise quantity can be based on measurements of total radio frequency power and preferably also powers of different channels.

Cell coverage is another issue, where power related quantities are required to be estimated. The coverage is normally related to a specific service that needs to operate at a specific Signal to Interference Ratio (SIR) to function normally. The cell boundary is then defined by a terminal that operates at maximum output power. The maximum received channel power in the RBS is defined by the maximum power of the terminal and the path-loss to the receiver. Since the path-loss is a direct function of the distance between the terminal and the Radio Base Station (RBS), a maximum distance from the RBS results. This distance, taken in all directions from the RBS, defines the coverage. It follows that in order to maintain the cell coverage that the operator has planned for, it is necessary to keep the interference below a specific level.

Thus different powers of a wireless communications system are often required to be estimated, total powers as well as powers of individual radio links. The powers may fluctuate substantially with time, and in some cases the variations are rather fast. A total power is typically much larger than a power of an individual radio link. There is furthermore typically a relationship between the different powers. This calls for making not only measurements of the powers, but preferably also for estimation of the power related quantities based on the measurements, taking models for expected variations into account. A Kalman filter may be a tentative choice for such estimations.

However, as it turns out, the complexity of a Kalman filter used for power estimation poses a major problem, since the complexity of the basic algorithm increases as the third power of the number of monitored power controlled radio links of the cell. As an example, the complexity of a typical embodiment for 50 radio links may be of the order of 50 MFLOPS for 10 ms measurement intervals. For 2 ms measurement intervals, the complexity would go beyond 200 MFLOPS. Such complexity may be too large leading to too high costs when implemented in communications network nodes today.

The Kalman filter estimates a state vector which dimension typically equals the number of radio links (n) of the cell plus 1 (the remaining power). This assumes that each radio link power is modelled by a one-dimensional dynamic model. Since the measurement matrix of the Kalman filter is of the same dimension, the covariance and gain updates of the Kalman filter become demanding. A complexity reduction seems to be required.

In order to perform a complexity reduction for a Kalman filter, it was first investigated if initially simple matrix structures were preserved when performing the Kalman filter iterations. The question raised is as to whether zeros appearing in certain elements in the system and measurement matrix did also occur in the same elements of the covariance matrices and Kalman gain matrices of the Kalman filter. Unfortunately, it is clear that no zeros at all were preserved in these matrices. All elements became nonzero already after one single iteration. The reason was tracked down to the inverse matrix used in the Kalman gain computation. The inversion step spreads nonzero elements all over the resulting matrix. Hence, this attempt to exploit the structure of the Kalman gain matrix and the corresponding covariance matrices for reducing complexity is not possible.

SUMMARY

A general problem with prior art systems for estimating power related quantities in wireless communications systems is that estimation procedures give rise to high demands for computational capacity.

A general object of the present invention is thus to achieve estimations of power related quantities requiring less computational efforts. A further object of the present invention is to achieve estimations of power related quantities having good properties in tracking fast varying powers.

The above objects are provided by methods, devices and systems according to the enclosed patent claims. In general words, a signal-power related quantity is estimated by repeating a processing step, where measured values of instantaneous signal powers are processed. At each relevant part step of the processing and for each relevant matrix, elements that are indicated to be negligibly small are changed to instead be exactly equal to zero. The computational complexity can thereby be decreased considerably. The principles are applied on determination of signal-power related quantities in wireless communications systems.

One advantage with the present invention is that the computational complexity of the algorithms can be kept reasonably low by the application of an approximate complexity reduction step.

BRIEF DESCRIPTION OF THE DRAWINGS

The invention, together with further objects and advantages thereof, may best be understood by making reference to the following description taken together with the accompanying drawings, in which:

FIGS. 3A-D are schematic illustrations of embodiments of zero patterns applied to matrices according to the present invention;

DETAILED DESCRIPTION

The present invention will below be illustrated by means of a method and system for determining noise rise in a WCDMA system. This particular application is, however, only an example of where the present invention advantageously can be applied. Anyone skilled in the art realizes that the merits of the present invention are applicable also to other types of wireless communications systems as well as to estimation of other types of power related quantities. The present invention is most advantageously applied in systems, where several interrelated power quantities of very differing sizes are to be estimated.

Figure 1:
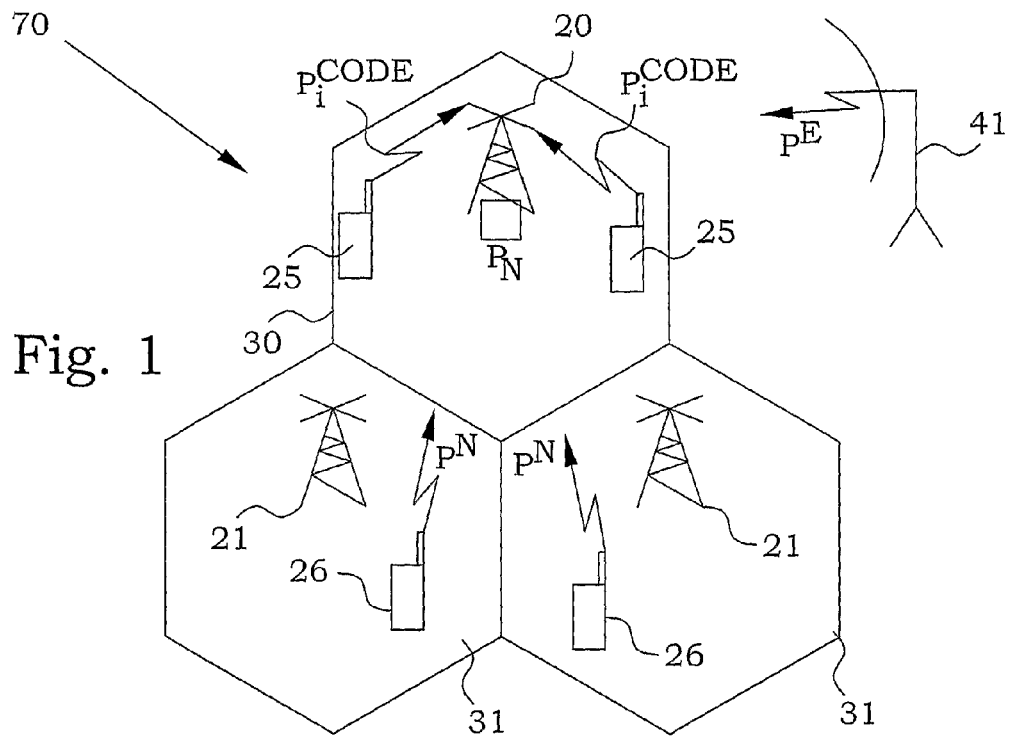
FIG. 1 is a schematic of a WCDMA system in which the present invention advantageously can be applied.

First, a brief description of an example system is given. FIG. 1 illustrates a WCDMA communications system 1. A coverage area of the system is divided into a number of cells 30. A radio base station (RBS) 20 is associated with the cell 30. Within the cell 30, a number of mobile terminals 25 are present, which communicates with the RBS 20 over different links. Each of the mobile terminals 25 contribute to the total received power in the receiver of the RBS by an amount $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, a $P_N$ term arises from the receiver itself, caused by thermal noise. The links can be of different types, e.g. using an AMR12.2/SRB 3.4 RAB, a PS64/SRB 3.4 RAB or an enhanced uplink radio link (E-DCH).

A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. Since all users of a cell transmit in the same frequency band, existing users in the cell as well as users in neighbouring cells contribute to the interference level. In order to retain stability of a cell, allowing enhanced uplink channels, the load has to be kept below a certain level. This is particularly difficult in systems utilising power control, since an increased interference level tends to increase the power of each individual link, which further increases the interference.

The load of a cell is often referred to some quantity related to power, typically noise rise or rise over thermal (ROT). Power quantities, such as total power and noise floor (ideally thermal noise), have to be determined. Determinations of highly fluctuating power quantities or noise floor are typically associated with relatively large uncertainties, which even may be of the same order of magnitude as the entire available capacity margin. It will thus be very difficult indeed to implement enhanced uplink channel capacity functionality without improving the load estimation connected thereto.

In order to improve the load estimation, different kinds of estimation procedures can be applied to measured power quantities. Such estimation procedures for estimating a signal-power related quantity are typically based on measurements of instantaneous values of a number m of signal powers at a plurality of time instances. The procedures may estimate a number n of state variables, typically associated with the measured signal powers, i.e. n=m. Such estimation is typically performed as a repetition of a processing step, whereby the state variables are successively updated. The processing step typically also involve at least one interdependency matrix, typically of dimension (n+1)×(m+1), where interdependencies between the state variables and/or measurements are expressed. The dimension is set by the number of measured values m plus the total power and the number of state variables n corresponding to channels plus the state variable corresponding to the remaining power. These interdependencies may in a typical case appear in covariance matrix or in gain matrix computations.

In the exemplifying embodiment described below, a Kalman filter approach is used, based on measurements of signal powers of different links as well as measurements of the total power. The state variables are selected as signal powers for the different links as well as the sum of neighbouring cell interference power and thermal noise power. The outcome therefore comprises estimated signal powers for the different links as well as for the sum of neighbouring cell interference power and thermal noise power, from which a load estimation can be performed. In particular, the load estimation can be an estimation of noise rise.

As described in the background section, a Kalman filtering of a relatively high number of state variables according to standard processing requires very large computational resources.

In order to reduce the computational complexity, it was according to the present invention investigated whether there is an "approximate structure of zero elements" present in the Kalman gain matrix and the covariance matrices, in the sense that parts of the matrix elements are negligible to the final result as compared to other elements. In order to investigate this, the Kalman filter code was complemented with code for computation of element by element RMS values, for all matrices used in the Kalman filter. The result for the Kalman filter covariance matrix for a model system is illustrated in FIG. 2.

Figure 2:
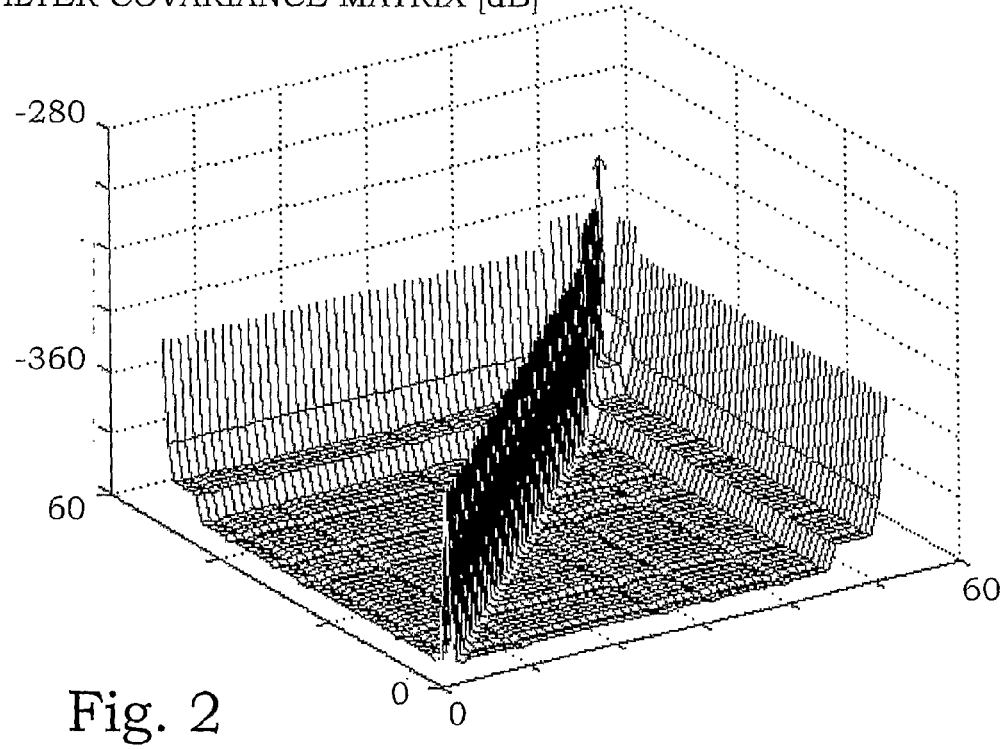
FIG. 2 is a diagram illustrating element by element RMS values of a Kalman filter covariance matrix.

From FIG. 2, it is seen that all elements outside the diagonal and edges seem to be small. All elements describing the coupling between different low bit rate speech and data links, e.g. utilising AMR12.2/SRB 3.4 RAB or PS64/SRB 3.4 RAB, seems to be "almost" zero. It may, however, be necessary to consider the coupling between high power E-DCH channels, at least the coupling between a pair of high power E-DCH channels. Such channels are typically few, so a substantial approximate complexity reduction should anyway be achievable. All elements at the diagonal are substantial as well as the elements at the edges, the latter corresponding to the coupling of a total power with different link powers.

The main idea emanating from this is simple in retrospect. At each relevant step and for each relevant matrix, elements that are indicated to be negligibly small are changed to instead be exactly equal to zero. The computational complexity can thereby be decreased considerably, simply since computations that are known to represent elements that are approximately zero, need not be performed at all. By just arranging the matrices of interest in order to form large block matrices, some of which with only zeros, a main matrix operation can be divided into a number of block matrix operations, where the block matrices have considerably smaller sizes. The present exemplifying embodiment is based on a Kalman filter, however, the present invention can be applied to any estimation principles utilising any concept of repeating a processing step, utilizing at least 3 state variables associated to a number of signal powers as well as co-dependencies therebetween.

FIGS. 3A-D illustrates the ideas of zero patterns. In FIG. 3A, a matrix 99 is schematically illustrated, having different state variables A-L associated with the two axis of the matrix 99. Each state variable can be associated e.g. with a signal power of a link or a sum of neighbouring cell interference power and thermal noise power. In FIG. 3A, state variable E corresponds to a sum of neighbouring cell interference power and thermal noise power, state variables B, H and K are associated with enhanced uplink radio links. Remaining state variables are associated with signal powers of "normal" speech links. The shadowing of elements 98 of the matrix 99 indicates an approximate contribution level to the final result. Here it can be concluded that all diagonal elements, as well as all elements involving the sum of neighbouring cell interference power and thermal noise power are of particular importance. Elements involving two enhanced uplink radio links are also significant, but smaller than for the total power. Remaining elements have a negligible contribution to the final result, however, the contribution is not exactly zero.

Since the order of the state variables is arbitrary, it is possible to rearrange the state variables in a "size" order. The state variable having the highest most probable value, e.g. the highest available total bitrate, is in FIG. 3B placed in the end. The remaining state variables are then placed in a decreasing size order, presenting the "smallest" state variable at the top. One can then immediately see that the elements of the matrix that significantly contribute to the final result are collected in the lower and/or right part of the matrix or at the diagonal. The elements that are of less importance are generally collected in non-diagonal positions at the top and the left of the matrix.

According to the ideas of the present invention, elements of less importance can in an approximation be set to exactly zero in order to simplify the computation. In FIG. 3C, all elements involving two different state variables, both having an expected "size" below a certain first threshold T1, are set to zero. This results in that a block matrix 100 only contains non-zero elements at the diagonal. Other block matrices 101-103 still contain non-zero elements at essentially all positions. The processing of a matrix according to FIG. 3C is considerably less complex than the processing of a matrix according to FIG. 3A or FIG. 3B.

By further studying the matrix of FIG. 3C, one realizes that further approximations can be performed. In FIG. 3D, elements involving a first state variable, lower than the first threshold T1, and a second state variable, higher than the first threshold T1 but lower than a second threshold T2, are also set to zero. This means that besides the diagonal block matrix 100, there are now two block matrices 104 and 105 that comprise only zeros. Block matrices 106-111 are still containing non-zero elements. This approximation further reduces the processing complexity. One can also notice that elements being associated to the sum of neighbouring cell interference power and thermal noise power are not influenced by the approximations. Only matrix elements being related to single channels are affected.

The matrices on which the above idea of approximation can be applied may also be of other types. For instance, a gain matrix in a Kalman filter expresses interdependencies between a state variable and an estimation error, in turn related to e.g. a channel, a total power or the sum of neighbouring cell interference power and thermal noise power.

In the discussion above, "size" of the state variable, e.g. available bit rate or expected power, has been used for dividing the matrix into block matrices, using at least one threshold. However, any criterion related to size can be used for grouping the state variables or estimation errors in order to form the part areas. One possibility is to decide if the state variables are associated with channels having communication using a RAB selected from a predetermined set of RABs, not having to define any specific threshold levels. The sum of neighbouring cell interference power and thermal noise power, and the total power are assumed to be much larger than any single channel.

These ideas of reducing the large matrix operation to a number of smaller matrix operations are below applied to the exemplifying system. Only the main lines are discussed below, but a full disclosure of the mathematical details is found in Appendix A.

The basic idea is thus to create a zero pattern in interdependency matrices. The interdependency matrices express interdependencies between a state variable and an estimation error, as e.g. in the gain matrix of a Kalman filter, or the interdependency matrices express interdependencies between components of two state vectors, i.e. covariances. The zero pattern is based on whether or not channels related to the state variable and the estimation error (or the two state vectors, respectively) both fulfil a certain first criterion or not. The matrix is preferably arranged in such a way that the zero pattern collects zero elements in certain block matrices, whereby a more efficient processing is possible. For even higher improvements in efficiency, a second criterion can be utilised, whereby a combination of state variables/estimation errors related to channels, of which only one fulfils the first criterion, but where the other fulfils the second criterion, are set to zero. The first criterion may e.g. be that an available bitrate is lower than a first threshold bitrate that is higher than any bitrate of any single voice channel of said cellular communications system. The second criterion may e.g. be that an available bitrate is lower than a second threshold bitrate that is higher than any bitrate of any single channel of said cellular communications system.

The zero pattern is most preferably applied to the gain matrix of the Kalman filter, which is a first type of interdependency matrix. However, it is additionally advantageous if the zero pattern can be further applied also to other interdependency matrices in the processing procedure, e.g. to the covariance matrices of the time varying Kalman filter.

Figure 5:
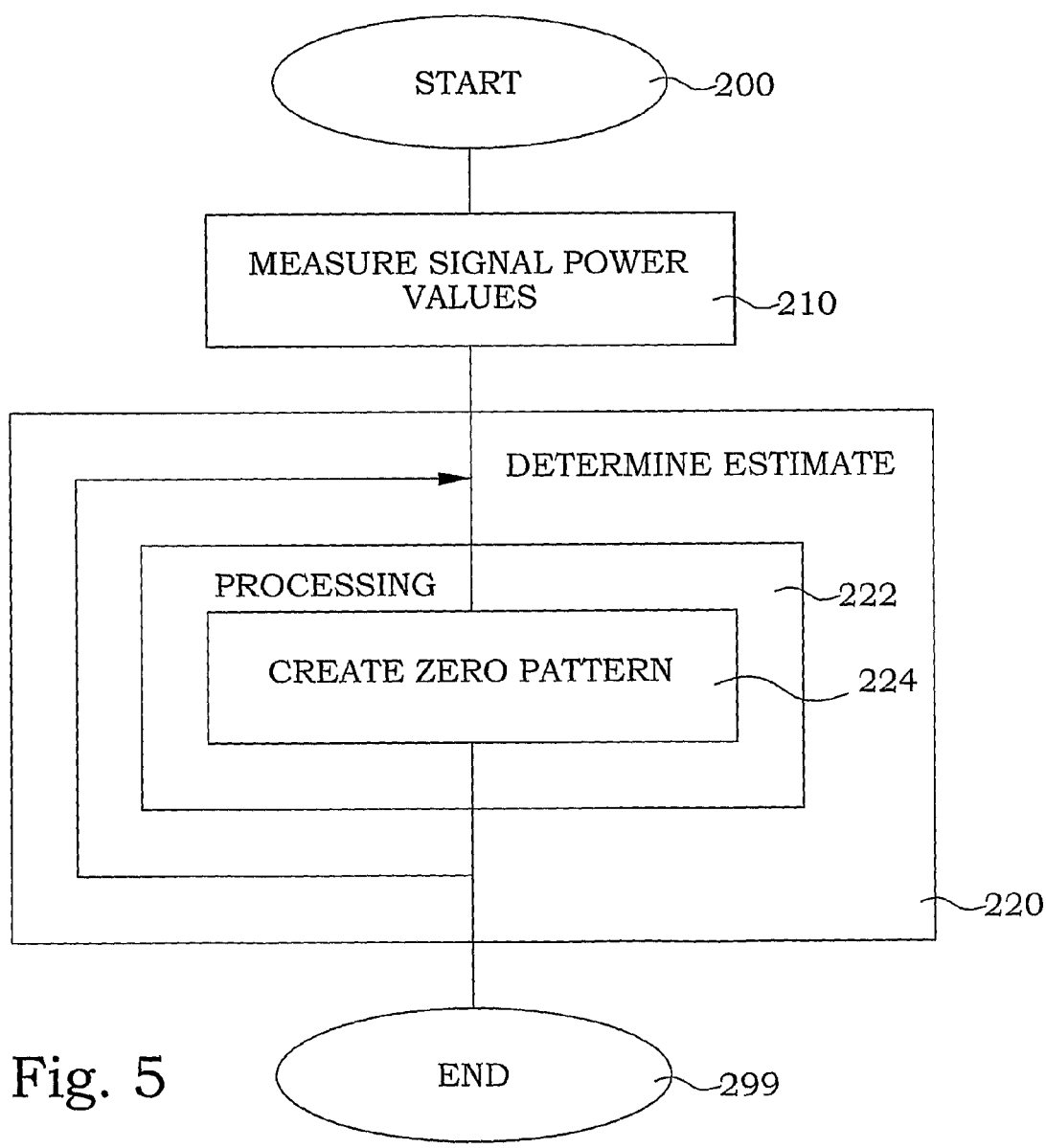
FIG. 5 is a flow diagram of main steps of an embodiment of a method according to the present invention.

Main steps of one embodiment of a method according to the present invention are illustrated in FIG. 5. The procedure starts in step 200. In step 210, instantaneous values of signal powers, e.g. a number m of channel powers and preferably also the total power, are measured at a plurality of time instances, where m>1. In step 220, estimates of powers are determined based on the measured instantaneous values of signal powers. This step in turn comprises a repetition of a processing step 222, which utilizes n+1 state variables associated to the powers to be estimated as well as at least one interdependency matrix. An interdependency matrix of a first kind has a dimension of $(n+1)\times(m+1)$. Preferably, also interdependency matrices of a second kind, expressing interdependencies between different state variables can be considered. These matrices have typically a dimension of $(n+1)\times(n+1)$. Preferably n=m. The processing step 222 further comprises the creation in step 224 of a zero pattern in the at least one interdependency matrix used in the processing step. The zero pattern is created by setting interdependencies between a state variable and an estimation error related to two different channels, both fulfilling a first criterion, to zero. The procedure stops at step 299.

Figure 6:
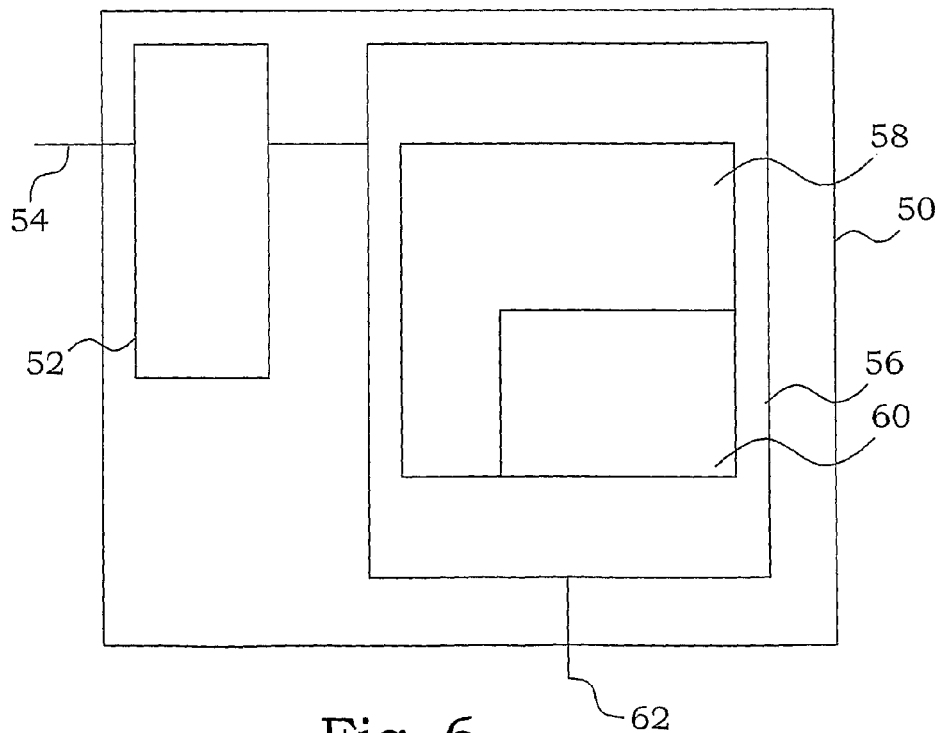
FIG. 6 is a block diagram of main parts of an embodiment of an arrangement according to the present invention.

Main parts of an embodiment of an arrangement 50 according to the present invention are illustrated in FIG. 6. This arrangement 50 is advantageously comprised in a node of a cellular communications system, such as e.g. the system of FIG. 1. The arrangement 50 is intended for estimating powers in a cellular communications system. The arrangement 50 comprises means 52 for obtaining measured instantaneous values of a number of signal powers at a plurality of time instances. This means 52 for obtaining measured instantaneous values can in particular embodiments be a measurement device actually measuring the signal powers via an input 54. In other particular embodiments, the means 52 for obtaining measured instantaneous values comprises a receiver for receiving measured instantaneous values via an input 54, where the actual measurement is performed at another device. The means 52 for obtaining measured instantaneous values is connected to an estimator 56, which is a means for determining an estimate of the powers. This is based on an input of measured instantaneous values from the means 52 for obtaining measured instantaneous values. The estimator 56 in turn comprises a processor 58, which constitutes a means for repeating a processing procedure, utilizing at least n+1 state variables associated to the powers to be estimated as well as an interdependency matrix, where n>1. The interdependency matrix of a first kind expresses interdependencies between state variables and to estimation errors and the dimension of the matrix then becomes (n+1)×(m+1). Preferably, also interdependency matrices of a second kind, expressing interdependencies between different state variables of a state vector can be considered. These matrices have typically a dimension of (n+1)×(n+1). The processor 58 comprises a zero pattern applicator 60, which is arranged for creating a zero pattern in the interdependency matrices that is used in the processor 58. The zero pattern is created by setting interdependencies between a state variable and an estimation error related to two different channels, both fulfilling a first criterion, to zero. The estimated powers are provided on an output 62 for further use in the communications system, e.g. for estimation of noise rise.

As indicated above, it is not an absolute necessity that the number of measured signal powers agree with the number of estimated state variables, even if this presently is believed to be most favourable. In case the number of measured signal powers and the number of state variables differ, the interdependency matrices may be non-quadratic. In the case of e.g. the gain matrix in the Kalman filter, has a dimension of (n+1)×(m+1), where m denotes the number of measured values, and n denotes the number of state variables. The principles presented above will be applicable also in this case, however, the "diagonal" elements discussed in the appendix have to be understood as the elements being related to the same channel. The covariance matrices of such a system is, however, still quadratic.

Performance of the complexity reduced algorithm was tested. An example simulation was performed over 30 minutes. A measurement interval of 100 ms was used. Some parts of the parameter setting are presented here. 45 radio links using the AMR12.2/SRB 3.4 RAB were incorporated. Control and data duty factors were 0.7 and 0.7, respectively. 5 radio links using the PS64/SRB 3.4 RAB were incorporated. Control and data duty factors were 0.7 and 0.7, respectively. 1 enhanced uplink radio link was incorporated using format 2, with control and data duty factors of 0.7 and 0.7, respectively. The power control constant applied was 0.9 for all radio links. The code power measurement errors were assumed to be 2 dB with respect to the C/I target for the AMR 12.2/SRB 3.4 RAB. All other radio links were assumed to have code power measurement errors of 1 dB. The RSSI measurement error was assumed to be −3 dB with respect to the nominal thermal noise power floor.

Figure 4:
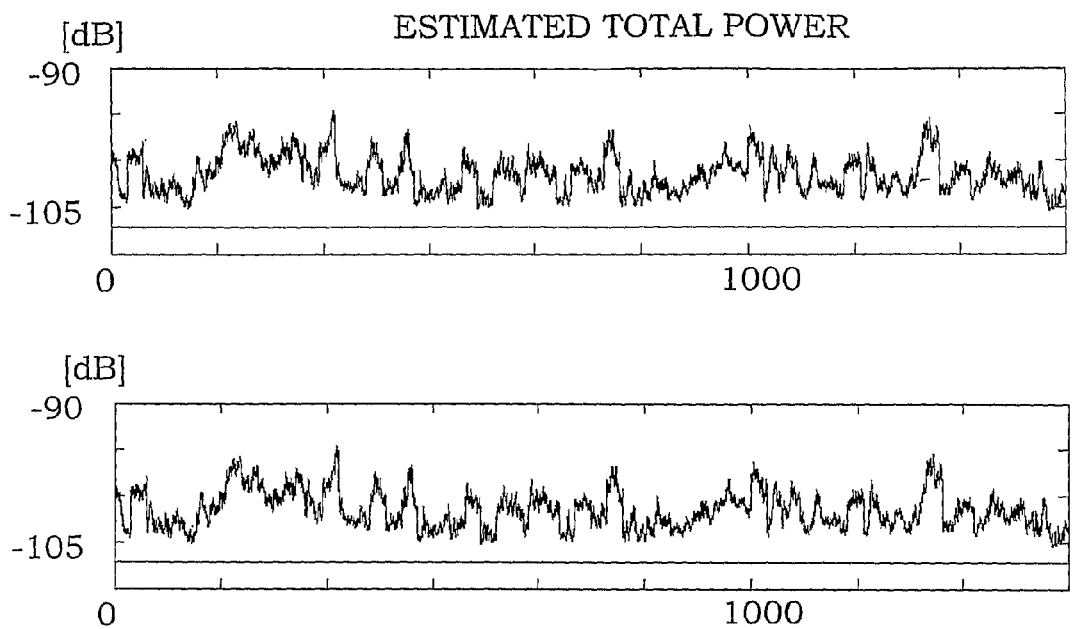
FIG. 4 is a diagram illustrating the absence of any serious impact of the approximation on an estimated total power.

The complete 52 state Kalman filter and the complexity reduced Kalman filter version according to the present invention were then run on the data and their outputs were compared. No specific problems were encountered during the runs and the output of the two filters could not be distinguished from each other visually. The conclusion seems to be that the proposed complexity reduction scheme is working well. A part of the outputs of the two filters appear in FIG. 4, where the upper part corresponds to the complete Kalman filter and the lower part corresponds to the complexity reduced Kalman filter version.

A final remark is needed. The large attenuation of non-diagonal matrix elements observed in the initial investigations of FIG. 2 may be an averaging effect. In other words, the attenuation may be less pronounced in case a smaller number of radio links are active in a cell. In case the complexity reduced filter would encounter problems in such cases, a remedy would be to run the complete Kalman filter when the number of radio links fall below a certain number. The number of radio links necessary to provide the averaging effect is believed to be less than 10, but also 5 radio links is believed to give a fairly good result. The complexity of the complete filter with such a few radio links is then anyway low enough to make a complete Kalman filtering possible with reasonable computational effort.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Following [1], p. 142 and p. 247, a Kalman filter based on the state space model:

$$x(t+T_{Min})=Ax(t)+Bu(t)+w(t) \quad (A1)$$

$$y(t)=C(t)x(t)+e(t), \quad (A2)$$

is treated. The filter is further given by the following recursive vector and matrix relations, where boldface denote non-scalar quantities:

$$K_f(t)=P(t|t-T_{Min})C^T(t)(C(t)P(t|t-T_{Min})C^T(t)+R_2(t))^{-1} \quad (A3)$$

$$\hat{x}(t|t)=\hat{x}(t|t-T_{Min})+K_f(t)(y(t)-C(t)\hat{x}(t|t-T_{Min})) \quad (A4)$$

$$P(t|t)=P(t|t-T_{Min})-K_f(t)C(t)P(t|t-T_{Min}) \quad (A5)$$

$$\hat{x}(t+T_{Min}|t)=Ax(t|t)+Bu(t) \quad (A6)$$

$$P(t+T_{Min}|t)=AP(t|t)A^T+R_1 \quad (A7)$$

Above:
t denotes the time,
$T_{Min}$ denotes the sampling period,
x denotes the estimated states,
y denotes the measurement matrix,
u denotes the input signal,
w denotes the systems noise,
e denotes the measurement noise,
A denotes the system matrix, B denotes the input matrix,
C denotes the measurement matrix,
$K_f$ denotes the Kalman filter gain matrix,
$P(t|t-T_{Min})$ denotes the predicted state covariance matrix,
$P(t|t)$ denotes the filtered state covariance matrix,
$R_2$ denotes the measurement covariance matrix, and
$R_1$ denotes the system noise covariance matrix.

Note that the two state covariance matrices differ only in their indexing in the notation below.

These 5 main equations of the Kalman filter applied for estimating powers are addressed one by one here below:

Kalman Gain

The Kalman gain equation of is given by (A3).

The ideas of the present invention now motivate the assumption that:

$$P(t|t-T_{Min}) = \begin{pmatrix} D_{(n-n_{EUL})}(P(t|t-T_{Min})) & 0 & P_{(n-n_{EUL})\times 1}(t|t-T_{Min}) \\ 0 & P_{n_{EUL}\times n_{EUL}}(t|t-T_{Min}) & P_{n_{EUL}\times 1}(t|t-T_{Min}) \\ (P_{(n-n_{EUL})\times 1}(t|t-T_{Min}))^T & (P_{n_{EUL}\times 1}(t|t-T_{Min}))^T & P(t|t-T_{Min}) \end{pmatrix} \quad (A8)$$

Here $n_{EUL}$ denotes the number of enhanced uplink channels. The operator $D_{q\times q}(\ )$ maps a given symmetric matrix onto a diagonal matrix that consists of the q first diagonal elements of the original matrix. This operator is exactly the one that represents the zeroing of (non-diagonal) elements referred to in the discussion further above.

The matrix $P(t|t-T_{Min})$ is built by a number of matrix blocks of differing dimensions. The subscripts indicate the dimensions of the matrix blocks. The superscripts indicate auxiliary information that is relevant for the complexity reduction. Scalars, e.g. the lower right element in the matrix, are shown as not-bold matrix blocks. No subscripts are shown for zero matrices. 1 denotes a column vector filled with 1's of appropriate dimension.

All other matrices that are inputs to the Kalman filter equations are partitioned accordingly, i.e. the same zero pattern as for the $P(t|t-T_{Min})$ is applied:

$$C(t) = \begin{pmatrix} C_{(n-n_{EUL})\times(n-n_{EUL})}^{Diagonal}(t) & 0 & 0 \\ 0 & C_{n_{EUL}\times n_{EUL}}^{Diagonal}(t) & 0 \\ 1_{1\times(n-n_{EUL})} & 1_{n_{EUL}} & 1 \end{pmatrix} \quad (A9)$$

$$R_2 = \begin{pmatrix} R_{2,(n-n_{EUL})\times(n-n_{EUL})}^{Diagonal} & 0 & 0 \\ 0 & R_{2,n_{EUL}\times n_{EUL}}^{Diagonal} & 0 \\ 0 & 0 & R_2^{Diagonal} \end{pmatrix} \quad (A10)$$

$$A = \begin{pmatrix} A_{(n-n_{EUL})\times(n-n_{EUL})}^{Diagonal} & 0 & 0 \\ 0 & A_{n_{EUL}\times n_{EUL}}^{Diagonal} & 0 \\ 0 & 0 & A^{Diagonal} \end{pmatrix} \quad (A11)$$

$$B = \begin{pmatrix} B_{(n-n_{EUL})\times(n-n_{EUL})}^{Diagonal} & 0 \\ 0 & B_{n_{EUL}\times n_{EUL}}^{Diagonal} \\ 0_{1\times(n-n_{EUL})} & 0 \end{pmatrix} \quad (A12)$$

$$R_1 = \begin{pmatrix} R_{1,(n-n_{EUL})\times(n-n_{EUL})}^{Diagonal} & 0 & 0 \\ 0 & R_{1,n_{EUL}\times n_{EUL}}^{Diagonal} & 0 \\ 0 & 0 & R_1^{Diagonal} \end{pmatrix} \quad (A13)$$

A calculation of the matrix $C(t)P(t|t-T_{Min})C^T(t)+R_2$, that is subject to inversion, results in $$Q(t) = C(t)P(t|t-T_{Min})C^T(t) + R_2 \quad (A14)$$

$$= \begin{pmatrix} Q_{(n-n_{EUL})\times(n-n_{EUL})}^{Diagonal}(t) & 0 & Q_{(n-n_{EUL})\times 1}(t) \\ 0 & Q_{n_{EUL}\times n_{EUL}}(t) & Q_{n_{EUL}\times 1}(t) \\ (Q_{(n-n_{EUL})\times 1}(t))^T & (Q_{n_{EUL}\times 1}(t))^T & Q(t) \end{pmatrix}.$$

Here:

$$Q_{(n-n_{EUL})\times(n-n_{EUL})}^{Diagonal}(t) = C_{(n-n_{EUL})\times(n-n_{EUL})}^{Diagonal}(t) D_{(n-n_{EUL})\times(n-n_{EUL})}(P(t|t-T_{Min})) C_{(n-n_{EUL})\times(n-n_{EUL})}^{Diagonal}(t) + R_{2,(n-n_{EUL})\times(n-n_{EUL})}^{Diagonal} \quad (A15)$$

$$Q_{(n-n_{EUL})\times 1}(t) = C_{(n-n_{EUL})\times(n-n_{EUL})}^{Diagonal}(t) D_{(n-n_{EUL})\times(n-n_{EUL})}(P(t|t-T_{Min}))1_{(n-n_{EUL})\times 1} + C_{(n-n_{EUL})\times(n-n_{EUL})}^{Diagonal}(t) P_{(n-n_{EUL})\times 1}(t|t-T_{Min}) \quad (A16)$$

$$Q_{n_{EUL}\times n_{EUL}}(t) = C_{n_{EUL}\times n_{EUL}}^{Diagonal}(t) P_{n_{EUL}\times n_{EUL}}(t|t-T_{Min}) C_{n_{EUL}\times n_{EUL}}^{Diagonal}(t) + R_{2,n_{EUL}\times n_{EUL}}^{Diagonal} \quad (A17)$$

$$Q_{n_{EUL}\times 1}(t) = C_{n_{EUL}\times n_{EUL}}^{Diagonal}(t) P_{n_{EUL}\times n_{EUL}}(t|t-T_{Min}) 1_{n_{EUL}\times 1} + C_{n_{EUL}\times n_{EUL}}^{Diagonal}(t) P_{n_{EUL}\times 1}(t|t-T_{Min}) \quad (A18)$$

$$Q(t) = 1_{(n-n_{EUL})\times 1}^T D_{(n-n_{EUL})\times(n-n_{EUL})}(P(t|t-T_{Min})) 1_{(n-n_{EUL})\times 1} + 1_{n_{EUL}\times 1}^T P_{n_{EUL}\times n_{EUL}}(t|t-T_{Min}) 1_{n_{EUL}\times 1} + 2 1_{(n-n_{EUL})\times 1}^T P_{(n-n_{EUL})\times 1}(t|t-T_{Min}) + 2 1_{n_{EUL}\times 1}^T P_{n_{EUL}\times 1}(t|t-T_{Min}) + P(t|t-T_{Min}). \quad (A19)$$

The initial structure of $P(t|t-T_{Min})$ is hence preserved, a fact that allows for a radical complexity reduction when inverting (A14). The computational cost of the above multiplication steps sum up to approximately $7n+3n_{EUL}^2$ arithmetic operations.

The first step of the inversion procedure is formalized by the setup of the following matrix, onto which elementary row operations are performed to calculate the inverse, according to the conventional Gaussian elimination procedure.

$$\begin{pmatrix} Q_{(n-n_{EUL})\times(n-n_{EUL})}(t) & 0 & Q^l_{(n-n_{EUL})\times 1}(t) & I_{(n-n_{EUL})\times(n-n_{EUL})} & 0 & 0 \\ 0 & Q_{n_{EUL}\times n_{EUL}}(t) & Q_{n_{EUL}\times 1}(t) & 0 & I_{n-EUL\times n_{EUL}} & 0 \\ (Q_{(n-n_{EUL})\times 1}(t))^T & (Q_{n_{EUL}\times 1}(t))^T & Q(t) & 0 & 0 & 1 \end{pmatrix} \quad \text{(A20)}$$

The complexity reduction of the inversion step follows from the observation that the zeros of the 1-2 and 2-1 block represent almost 100% of the matrix blocks of the inverted matrix.

The inversion procedure becomes as follows. Subtract scaled rows from the last row of (A20). Starting with row 1 and proceeding to row $n-n_{EUL}$. This step transforms (A20) into:

$$\begin{pmatrix} Q^{Diagonal}_{(n-n_{EUL})\times(n-n_{EUL})}(t) & 0 & Q^l_{(n-n_{EUL})\times 1}(t) & I_{(n-n_{EUL})\times(n-n_{EUL})} & 0 & 0 \\ 0 & Q_{n_{EUL}\times n_{EUL}}(t) & Q_{n_{EUL}\times 1}(t) & 0 & I_{n_{EUL}\times n_{EUL}} & 0 \\ 0 & (Q_{n_{EUL}\times 1}(t))^T & Q_1(t) & \overline{Q}_{1,(n-n_{EUL})\times 1}(t) & 0 & 1 \end{pmatrix} \quad \text{(A21)}$$

The cost is $4(n-n_{EUL})$ arithmetic operations, mostly multiply and add.

Proceed by transforming the lower right block of dimension $(n_{EUL}+1)\times(n_{EUL}+1)$ of (A21), of the matrix to be inverted, to an upper triangular matrix by performing repeated elementary row operations. The result is:

$$\begin{pmatrix} Q^{Diagonal}_{(n-n_{EUL})\times(n-n_{EUL})}(t) & 0 & Q^l_{(n-n_{EUL})\times 1}(t) & I_{(n-n_{EUL})\times(n-n_{EUL})} & 0 & 0 \\ 0 & Q^{Triangular}_{2,n_{EUL}\times n_{EUL}}(t) & Q_{2,n_{EUL}\times 1}(t) & 0 & \overline{Q}_{2,n_{EUL}\times n_{EUL}}(t) & 0 \\ 0 & 0 & Q_2(t) & \overline{Q}_{1,1\times(n-n_{EUL})}(t) & \overline{Q}_{2,1\times n_{EUL}} & 1 \end{pmatrix} \quad \text{(A22)}$$

The cost is approximately $0.5 n_{EUL}^3$ arithmetic operations, mostly multiply and add.

Perform back-substitution on the lower right block of dimension $(n_{EUL}+1)\times(n_{EUL}+1)$ of (A22), of the matrix to be inverted, by performing elementary row operations. The result is:

$$\begin{pmatrix} Q^{Diagonal}_{(n-n_{EUL})\times(n-n_{EUL})}(t) & 0 & Q_{(n-n_{EUL})\times 1}(t) & I_{(n-n_{EUL})\times(n-n_{EUL})} & 0 & 0 \\ 0 & Q^{Diagonal}_{2,n_{EUL}\times n_{EUL}}(t) & 0 & \overline{Q}_{3,n_{EUL}\times(n-n_{EUL})}(t) & \overline{Q}_{3,n_{EUL}\times n_{EUL}}(t) & \overline{Q}_{3,n_{EUL}\times 1}(t) \\ 0 & 0 & Q_2(t) & \overline{Q}_{1,1\times(n-n_{EUL})}(t) & \overline{Q}_{2,1\times n_{EUL}}(t) & 1 \end{pmatrix} \quad \text{(A23)}$$

The cost is approximately $0.5 n_{EUL}^2 (n+2)$.

Perform back substitution to replace the block $Q_{(n-n_{EUL})\times 1}(t)$ with zeros. This is performed by subtraction of scaled versions of the last row of (A23). The result is:

$$\begin{pmatrix} Q^{Diagonal}_{(n-n_{EUL})\times(n-n_{EUL})}(t) & 0 & 0 & \overline{Q}_{4,(n-n_{EUL})\times(n-n_{EUL})}(t) & \overline{Q}_{4,(n-n_{EUL})\times n_{EUL}}(t) & \overline{Q}_{4,(n-n_{EUL})\times 1}(t) \\ 0 & Q^{Diagonal}_{2,n_{EUL}\times n_{EUL}}(t) & 0 & \overline{Q}_{3,n_{EUL}\times(n-n_{EUL})}(t) & \overline{Q}_{3,n_{EUL}\times n_{EUL}}(t) & \overline{Q}_{3,n_{EUL}\times 1}(t) \\ 0 & 0 & Q_2(t) & \overline{Q}_{1,1\times(n-n_{EUL})}(t) & \overline{Q}_{2,1\times n_{EUL}}(t) & 1 \end{pmatrix} \quad \text{(A24)}$$

The cost is approximately $(n-n_{EUL})(n+2)$ arithmetic operations, mostly multiply and adds.

Finally, perform a scaling to achieve a unity matrix in the left part of the tableau. The cost is approximately $(n+2)^2$ arithmetic operations, mostly multiplies.

The final result is an inverse, which zero structure is not preserved. The inversion cost is approximately $2n^2+0.5(n+n_{EUL})n_{EUL}^2$ arithmetic operations, i.e. a very significant saving as compared to the normal cost of $2n^3$. Note that the cost to multiply together the matrix to be inverted can be neglected.

The final computation of the Kalman gain requires two further matrix multiplications following the matrix inverse computation. First noting that:

$$P(t\mid t-T_{Min})C^T(t) = $$

$$\begin{pmatrix} D_{(n-n_{EUL})\times(n-n_{EUL})}(P(t\mid t-T_{Min})) & 0 & P'_{(n-n_{EUL})\times 1}(t\mid t-T_{Min}) \\ 0 & P_{n_{EUL}\times n_{EUL}}(t\mid t-T_{Min}) & P_{n_{EUL}\times 1}(t\mid t-T_{Min}) \\ (P_{(n-n_{EUL})\times 1}(t\mid t-T_{Min}))^T & (P'_{n_{EUL}\times 1}(t\mid t-T_{Min}))^T & P(t\mid t-T_{Min}) \end{pmatrix} \times$$

$$\begin{pmatrix} C^{Diagonal}_{(n-n_{EUL})\times(n-n_{EUL})}(t) & 0 & 1_{(n-n_{EUL})\times 1} \\ 0 & C^{Diagonal}_{n_{EUL}\times n_{EUL}}(t) & 1_{n_{EUL}\times 1} \\ 0 & 0 & 1 \end{pmatrix} = $$

$$\begin{pmatrix} S_{(n-n_{EUL})\times(n-n_{EUL})}(t) & 0 & S_{(n-n_{EUL})\times 1}(t) \\ 0 & S_{n_{EUL}\times n_{EUL}}(t) & S_{n_{EUL}\times 1}(t) \\ S_{1\times(n-n_{EUL})}(t) & S_{1\times(n-n_{EUL})}(t) & S(t) \end{pmatrix} = S(t).$$

(A25)

Here:

$$S^{Diagonal}_{(n-n_{EUL})\times(n-n_{EUL})}(t) = D_{(n-n_{EUL})\times(n-n_{EUL})}(P(t\mid t-T_{Min}))C^{Diagonal}_{(n-n_{EUL})\times(n-n_{EUL})}(t) \quad (A26)$$

$$S_{(n-n_{EUL})\times 1}(t) = D_{(n-n_{EUL})\times(n-n_{EUL})}(P(t\mid t-T_{Min}))1_{(n-n_{EUL})\times 1} + P_{(n-n_{EUL})\times 1}(t\mid t-T_{Min}) \quad (A27)$$

$$S_{n_{EUL}\times n_{EUL}}(t) = P_{n_{EUL}\times n_{EUL}}(t\mid t-T_{Min})C^{Diagonal}_{n_{EUL}\times n_{EUL}}(t) \quad (A28)$$

$$S_{n_{EUL}\times 1}(t) = P_{n_{EUL}\times n_{EUL}}(t\mid t-T_{Min})1_{n_{EUL}\times 1} + P_{n_{EUL}\times 1}(t\mid t-T_{Min}) \quad (A29)$$

$$S_{1\times(n-n_{EUL})}(t) = (P_{(n-n_{EUL})\times 1}(t\mid t-T_{Min}))^T C^{Diagonal}_{(n-n_{EUL})\times(n-n_{EUL})}(t) \quad (A30)$$

$$S_{1\times n_{EUL}}(t) = (P_{n_{EUL}\times 1}(t\mid t-T_{Min}))^T C^{Diagonal}_{n_{EUL}\times n_{EUL}}(t) \quad (A31)$$

$$S(t) = (P_{(n-n_{EUL})\times 1}(t\mid t-T_{Min}))^T 1_{(n-n_{EUL})\times 1} + (P_{n_{EUL}\times 1}(t\mid t-T_{Min}))^T 1_{n_{EUL}\times 1} + P(t\mid t-T_{Min}). \quad (A32)$$

Note that S(t) is not symmetric. The cost of this matrix multiply is approximately $3n+n_{EUL}^2$ arithmetic operations.

The final step of the calculation is to use the result of the matrix inverse (A24) and (A25-A32) to calculate $S(t)Q^{-1}(t)$.

Here $Q^{-1}(t)$ does not have any specific structure other than symmetry. Fortunately, the structure of S(t) prevents complexity from being cubic in the matrix order. This can be seen as follows:

$$S(t)Q^{-1}(t) = \quad (A33)$$

$$\begin{pmatrix} S_{(n-n_{EUL})\times(n-n_{EUL})}(t) & 0 & S_{(n-n_{EUL})\times 1}(t) \\ 0 & S_{n_{EUL}\times n_{EUL}}(t) & S_{n_{EUL}\times 1}(t) \\ S_{1\times(n-n_{EUL})}(t) & S_{1\times(n-n_{EUL})}(t) & S(t) \end{pmatrix} \times$$

$$\begin{pmatrix} Q^{-1}_{(n-n_{EUL})\times(n-n_{EUL})}(t) & Q^{-1}_{(n-n_{EUL})\times n_{EUL}}(t) & Q^{-1}_{(n-n_{EUL})\times 1}(t) \\ (Q^{-1}_{(n-n_{EUL})\times n_{EUL}}(t))^T & Q^{-1}_{n_{EUL}\times n_{EUL}}(t) & Q^{-1}_{n_{EUL}\times 1}(t) \\ (Q^{-1}_{(n-n_{EUL})\times 1}(t))^T & (Q^{-1}_{n_{EUL}\times 1}(t))^T & Q^{-1}(t) \end{pmatrix} = $$

$$\begin{pmatrix} T_{(n-n_{EUL})\times(n-n_{EUL})}(t) & T_{(n-n_{EUL})\times n_{EUL}}(t) & T_{(n-n_{EUL})\times 1}(t) \\ T_{n_{EUL}\times(n-n_{EUL})}(t) & T_{n_{EUL}\times n_{EUL}}(t) & T_{n_{EUL}\times 1}(t) \\ T_{1\times(n-n_{EUL})}(t) & T_{1\times n_{EUL}}(t) & T(t) \end{pmatrix} = $$

$T(t).$

The matrix blocks, and the corresponding complexities using the symmetry of $Q^{-1}(t)$, are given by:

$$T_{(n-n_{EUL})\times(n-n_{EUL})}(t) = S^{Diagonal}_{(n-n_{EUL})\times(n-n_{EUL})}(t)Q^{-1}_{(n-n_{EUL})\times(n-n_{EUL})}(t) + S_{(n-n_{EUL})\times 1}(t)(Q^{-1}_{(n-n_{EUL})\times 1}(t))^T \quad (A34)$$

$$T_{(n-n_{EUL})\times n_{EUL}}(t) = S^{Diagonal}_{(n-n_{EUL})\times(n-n_{EUL})}(t)Q^{-1}_{(n-n_{EUL})\times n_{EUL}}(t) + S_{(n-n_{EUL})\times 1}(t)(Q^{-1}_{n_{EUL}\times 1}(t))^T \quad (A35)$$

$$T_{(n-n_{EUL})\times 1}(t) = S^{Diagonal}_{(n-n_{EUL})\times(n-n_{EUL})}(t)Q^{-1}_{(n-n_{EUL})\times 1}(t) + S_{(n-n_{EUL})\times 1}(t)Q^{-1}(t) \quad (A36)$$

$$T_{n_{EUL}\times(n-n_{EUL})}(t) = S_{n_{EUL}\times n_{EUL}}(t)(Q^{-1}_{(n-n_{EUL})\times n_{EUL}}(t))^T + S_{n_{EUL}\times 1}(t)(Q^{-1}_{(n-n_{EUL})\times 1}(t))^T \quad (A37)$$

$$T_{n_{EUL}\times n_{EUL}}(t) = S_{n_{EUL}\times n_{EUL}}(t)Q^{-1}_{n_{EUL}\times n_{EUL}}(t) + S_{n_{EUL}\times 1}(t)(Q^{-1}_{n_{EUL}\times 1}(t))^T \quad (A38)$$

$$T_{n_{EUL}\times 1}(t) = S_{n_{EUL}\times n_{EUL}}(t)Q^{-1}_{n_{EUL}\times 1}(t) + S_{n_{EUL}\times 1}(t)Q^{-1}(t) \quad (A39)$$

$$T_{1\times(n-n_{EUL})}(t) = S_{1\times(n-n_{EUL})}(t)Q^{-1}_{(n-n_{EUL})\times(n-n_{EUL})}(t) + S_{1\times n}(Q^{-1}_{(n-n_{EUL})\times n_{EUL}}(t))^T + S(t)(Q^{-1}_{(n-n_{EUL})\times 1}(t))^T \quad (A40)$$

$$T_{1\times n_{EUL}}(t) = S_{1\times(n-n_{EUL})}(t)Q^{-1}_{(n-n_{EUL})\times n_{EUL}}(t) + S_{1\times n_{EUL}}(t)Q^{-1}_{n_{EUL}\times n_{EUL}}(t) + S(t)(Q^{-1}_{n_{EUL}\times 1}(t))^T \quad (A41)$$

$$T(t) = S_{1\times(n-n_{EUL})}(t)Q^{-1}_{(n-n_{EUL})\times 1}(t) + S_{1\times n_{EUL}}(t)Q^{-1}_{n_{EUL}\times 1}(t) + S(t)Q^{-1}(t) \quad (A42)$$

The final step in the calculation of the Kalman gain matrix is to exploit the experimental result and to set elements to zero according to the main idea described above. This gives:

$$K_f(t) \approx \begin{pmatrix} D_{(n-n_{EUL})\times(n-n_{EUL})}(T(t)) & 0 & T_{(n-n_{EUL})\times 1}(t) \\ 0 & T_{n_{EUL}\times n_{EUL}}(t) & T_{n_{EUL}\times 1}(t) \\ T_{1\times(n-n_{EUL})}(t) & T_{1\times n_{EUL}}(t) & T(t) \end{pmatrix} \quad (A43)$$

It remains to assess the computational complexity of the last matrix multiply. Summing up per matrix block gives:

$D_{(n-n_{EUL})\times(n-n_{EUL})}(T(t))$ $2(n-n_{EUL})$—only diagonal needs to be computed.

$T_{(n-n_{EUL})\times 1}(t)$ $2(n-n_{EUL})$ $T_{n_{EUL}\times n_{EUL}}(t)$ $n_{EUL}^3 + n_{EUL}^2$ $T_{n_{EUL}\times 1}(t)$ $n_{EUL}^2 + n_{EUL}$ $T_{1\times(n-n_{EUL})}(t)$ $(n-n_{EUL})^2 + (n-n_{EUL})n_{EUL} + (n-n_{EUL})$ $T_{1\times n_{EUL}}(t)$ $(n-n_{EUL})n_{EUL} + n_{EUL}^2 + n_{EUL}$ $T(t)$ $(n-n_{EUL}) + n_{EUL} + 1$ The complexity of the last step hence becomes approximately $n^2 + n_{EUL}^3$ arithmetic operations.

The complete complexity for the Kalman gain computation hence sums up to approximately $$KalmanGainComplexity \approx \frac{3n^2 + 0.5nn_{EUL}^2 + 1.5n_{EUL}^3}{TTI} FLOPs. \quad (A44)$$

State Filter Update

The complexity reduction of this equation is almost trivial. However, for completeness the block matrix equations are written out explicitly. The result is:

$$\begin{pmatrix} x_{n-n_{EUL}}(t|t) \\ x_{n_{EUL}}(t|t) \\ x(t|t) \end{pmatrix} = \begin{pmatrix} x_{n-n_{EUL}}(t|t-T_{Min}) \\ x_{n_{EUL}}(t|t-T_{Min}) \\ x(t|t-T_{Min}) \end{pmatrix} +$$

$$\begin{pmatrix} K_{f,(n-n_{EUL})\times(n-n_{EUL})}^{Diagonal}(t)(y_{n-n_{EUL}}(t) - C_{(n-n_{EUL})\times(n-n_{EUL})}^{Diagonal}(t)x_{n-n_{EUL}}(t|t-T_{Min})) \\ K_{f,n_{EUL}\times n_{EUL}}(t)(y_{n_{EUL}}(t) - C_{n_{EUL}\times n_{EUL}}^{Diagonal}(t)x_{n_{EUL}}(t|t-T_{Min})) \\ K_{f,1\times(n-n_{EUL})}(t)(y_{n-n_{EUL}}(t) - C_{(n-n_{EUL})\times(n-n_{EUL})}^{Diagonal}(t)x_{n-n_{EUL}}(t|t-T_{Min})) \end{pmatrix} +$$

$$\begin{pmatrix} K_{f,(n-n_{EUL})\times 1}(t)(y(t) - 1^T x_{n-n_{EUL}}(t|t-T_{Min}) - 1^T x_{n_{EUL}}(t|t-T_{Min}) - x(t|t-T_{Min})) \\ K_{f,n_{EUL}\times 1}(t)(y(t) - 1^T x_{n-n_{EUL}}(t|t-T_{Min}) - 1^T x_{n_{EUL}}(t|t-T_{Min}) - x(t|t-T_{Min})) \\ K_{f,1\times n_{EUL}}(t)(y_{n_{EUL}}(t) - C_{n_{EUL}\times n_{EUL}}^{Diagonal}(t)x_{n_{EUL}}(t|t-T_{Min})) \end{pmatrix} +$$

$$\begin{pmatrix} 0 \\ 0 \\ K_f(t)(y(t) - 1^T x_{n-n_{EUL}}(t|t-T_{Min}) - 1^T x_{n_{EUL}}(t|t-T_{Min}) - x(t|t-T_{Min})) \end{pmatrix}.$$

(A45)

The complexity becomes:

$$StateFilterUpdateComplexity \approx \frac{5n + n_{EUL}^2}{TTI} FLOPs. \quad (A46)$$

State Covariance Update

The handling of this update equation is divided in two steps, one for each matrix multiply.

The first matrix multiplication of the state covariance update equation is the following one that can be handled similarly as (A14)

$$U(t) = C(t)P(t|t-T_{Min}) = \quad (A47)$$

$$\begin{pmatrix} U_{(n-n_{EUL})\times(n-n_{EUL})}^{Diagonal}(t) & 0 & U_{(n-n_{EUL})\times 1}(t) \\ 0 & U_{n_{EUL}\times n_{EUL}}(t) & U_{n_{EUL}\times 1}(t) \\ U_{1\times(n-n_{EUL})}(t) & U_{1\times n_{EUL}}(t) & U(t) \end{pmatrix}.$$

Here $U_{(n-n_{EUL})\times(n-n_{EUL})}^{Diagonal}(t) =$
$C_{(n-n_{EUL})\times(n-n_{EUL})}^{Diagonal}(t)$
$D_{(n-n_{EUL})\times(n-n_{EUL})}(P(t|t-T_{Min}))$ (A48)

$U_{(n-n_{EUL})\times 1}(t) = C_{(n-n_{EUL})\times(n-n_{EUL})}^{Diagonal}(t)$
$P_{(n-n_{EUL})\times 1}(t|t-T_{Min})$ (A49)

$U_{n_{EUL}\times n_{EUL}}(t) = C_{n_{EUL}\times n_{EUL}}^{Diagonal}(t)$
$P_{n_{EUL}\times n_{EUL}}(t|t-T_{Min})$ (A50)

$U_{n_{EUL}\times 1}(t) = C_{n_{EUL}\times n_{EUL}}^{Diagonal}(t)P_{n_{EUL}\times 1}(t|t-T_{Min})$ (A51)

$U_{1\times(n-n_{EUL})}(t) = 1^T D_{(n-n_{EUL})\times(n-n_{EUL})}(P(t|t-T_{Min})) +$
$(P_{(n-n_{EUL})\times 1}(t|t-T_{Min}))^T$ (A52)

$U_{1\times n_{EUL}}(t) = 1^T P_{n_{EUL}\times n_{EUL}}(t|t-TTI) +$
$(P_{n_{EUL}\times 1}(t|t-T_{Min}))^T$ (A53)

$U(t) = 1^T(P_{(n-n_{EUL})\times 1}(t|t-T_{Min}))^T +$
$1^T(P_{n_{EUL}\times 1}(t|t-T_{Min}))^T + P(t|t-T_{Min}).$ (A54)

The initial structure of $P(t|t-T_{Min})$ is hence preserved, although symmetry is lost.

The complexity of the first matrix multiplication step becomes approximately $4n + n_{EUL}^2$ arithmetic operations.

The second step multiplies $K_f(t)$ and the result, $U(t)$ of (A54). This step can be described as follows, using (A43):

$$V(t) = K_f(t)U(t) = \quad (A55)$$

$$\begin{pmatrix} D_{(n-n_{EUL})\times(n-n_{EUL})}T(t)) & 0 & T_{(n-n_{EUL})\times 1}(t) \\ 0 & T_{n_{EUL}\times n_{EUL}}(t) & T_{n_{EUL}\times 1}(t) \\ T_{1\times(n-n_{EUL})}(t) & T_{1\times n_{EUL}}(t) & T(t) \end{pmatrix} \times$$

-continued $$\begin{pmatrix} U^{Diagonal}_{(n-n_{EUL})\times(n-n_{EUL})}(t) & 0 & U_{(n-n_{EUL})\times 1}(t) \\ 0 & U_{n_{EUL}\times n_{EUL}}(t) & U_{n_{EUL}\times 1}(t) \\ U_{1\times(n-n_{EUL})}(t) & U_{1\times n_{EUL}}(t) & U(t) \end{pmatrix} =$$

$$\begin{pmatrix} V_{(n-n_{EUL})\times(n-n_{EUL})}(t) & V_{(n-n_{EUL})\times n_{EUL}}(t) & V_{(n-n_{EUL})\times 1}(t) \\ (V_{(n-n_{EUL})\times 1})^T & V_{n_{EUL}\times n_{EUL}}(t) & V_{n_{EUL}\times 1}(t) \\ (V_{(n-n_{EUL})\times 1}(t))^T & (V_{n_{EUL}\times 1}(t))^T & V(t) \end{pmatrix}.$$

Note that structure is not preserved, however symmetry is regained. The reason is that the result, when subtracted from the state covariance prediction, must be symmetric. The matrix blocks of (A55) become $$V_{(n-n_{EUL})\times(n-n_{EUL})}(t) = K_{f,(n-n_{EUL})\times(n-n_{EUL})}^{Diagonal}(t) U_{(n-n_{EUL})\times(n-n_{EUL})}(t) + K_{f,(n-n_{EUL})\times 1}(t) U_{1\times(n-n_{EUL})}(t) \quad (A56)$$

$$V_{(n-n_{EUL})\times n_{EUL}}(t) = K_{f,(n-n_{EUL})\times 1}(t) U_{1\times n_{EUL}}(t) \quad (A57)$$

$$V_{(n-n_{EUL})\times 1}(t) = K_{f,(n-n_{EUL})\times(n-n_{EUL})}^{Diagonal}(t) U_{(n-n_{EUL})\times 1}(t) + K_{f,(n-n_{EUL})\times 1}(t) U(t) \quad (A58)$$

$$V_{n_{EUL}\times n_{EUL}}(t) = K_{f,n_{EUL}\times n_{EUL}}(t) U_{n_{EUL}\times n_{EUL}}(t) + K_{f,n_{EUL}\times 1}(t) U_{1,n_{EUL}}(t) \quad (A59)$$

$$V_{n_{EUL}\times 1}(t) = K_{f,n_{EUL}\times n_{EUL}}(t) U_{n_{EUL}\times 1}(t) + K_{f,n_{EUL}\times 1}(t) U(t) \quad (A60)$$

$$V(t) = K_{f,1\times(n-n_{EUL})}(t) U_{(n-n_{EUL})\times 1}(t) + K_{f,1\times n_{EUL}}(t) U_{n_{EUL}\times 1}(t) + K_f(t) U(t). \quad (A61)$$

Before the complexity is assessed it is noted that a final subtractive step is performed, followed by a zeroing of non-diagonal elements according to the main complexity reduction idea. This results in the following final equation:

$$P(t\mid t) \approx \quad (A62)$$

$$\begin{pmatrix} D_{(n-n_{EUL})\times(n-n_{EUL})}(P(t\mid t-T_{Min})) & 0 & P_{(n-n_{EUL})\times 1}(t\mid t-T_{Min}) \\ 0 & P_{n_{EUL}\times n_{EUL}}(t\mid t-T_{Min}) & P_{n_{EUL}\times 1}(t\mid t-T_{Min}) \\ (P_{(n-n_{EUL})\times 1}(t\mid t-T_{Min}))^T & (P_{n_{EUL}\times 1}(t\mid t-T_{Min}))^T & P(t\mid t-T_{Min}) \end{pmatrix} -$$

$$\begin{pmatrix} D_{(n-n_{EUL})\times(n-n_{EUL})}(V(t)) & 0 & V_{(n-n_{EUL})\times 1}(t) \\ 0 & V_{n_{EUL}\times n_{EUL}}(t) & V_{n_{EUL}\times 1}(t) \\ (V_{(n-n_{EUL})\times 1}(t))^T & (V_{n_{EUL}\times 1}(t))^T & V(t) \end{pmatrix}.$$

The complexity of the last matrix multiply, after reduction, can then be calculated. The complexity becomes approximately $5n+n_{EUL}^3$ arithmetic operations. The final subtraction contributes with approximately $3n+n_{EUL}^2$ arithmetic operations.

Summing up, the total figure for the filter covariance update step becomes $$FilterCovarianceUpdateComplexity = \frac{8n+n_{EUL}^3}{TTI} FLOPs. \quad (A63)$$

State Prediction

The complexity reduction of this equation is almost trivial. However, for completeness the block matrix equations are written out explicitly. The result is:

$$\begin{pmatrix} x_{n-n_{EUL}}(t+T_{Min}\mid t) \\ x_{n_{EUL}}(t+T_{Min}\mid t) \\ x(t+T_{Min}\mid t) \end{pmatrix} = \quad (A64)$$

$$\begin{pmatrix} A^{Diagonal}_{(n-n_{EUL})\times(n-n_{EUL})} x_{n-n_{EUL}}(t\mid t) + B^{Diagonal}_{(n-n_{EUL})\times(n-n_{EUL})} u_{n-n_{EUL}}(t) \\ A^{Diagonal}_{n_{EUL}\times n_{EUL}} x_{n_{EUL}}(t\mid t) + B^{Diagonal}_{n_{EUL}\times n_{EUL}} u_{n_{EUL}}(t) \\ A^{Diagonal} x(t\mid t) \end{pmatrix}$$

The complexity becomes:

$$StateFilterUpdateComplexity \approx \frac{2n}{TTI} FLOPs. \quad (A65)$$

Covariance Prediction

Since the matrices A and $R_1$ are both diagonal, the complexity evaluation of the covariance prediction equation becomes straightforward. Writing out block matrices results in:

$$P(t+T_{Min}\mid t) = \quad (A66)$$

$$\begin{pmatrix} P^{Diagonal}_{(n-n_{EUL})\times(n-n_{EUL})}(t+T_{Min}\mid t) & 0 & P_{(n-n_{EUL})\times 1}(t+T_{Min}\mid t) \\ 0 & P_{n_{EUL}\times n_{EUL}}(t+T_{Min}\mid t) & P_{n_{EUL}\times 1}(t+T_{Min}\mid t) \\ (P_{(n-n_{EUL})\times 1}(t+T_{Min}\mid t))^T & (P_{n_{EUL}\times 1}(t+T_{Min}\mid t))^T & P(t+T_{Min}\mid t) \end{pmatrix}.$$

The block matrices become:

$$P_{(n-n_{EUL})\times(n-n_{EUL})}^{Diagonal}(t+T_{Min}|t) = \\ A_{(n-n_{EUL})\times(n-n_{EUL})}^{Diagonal} D_{(n-n_{EUL})\times(n-n_{EUL})}^{Diagonal}(P(t|t)) \\ A_{(n-n_{EUL})\times(n-n_{EUL})}^{Diagonal} + \\ R_{1,(n-n_{EUL})\times(n-n_{EUL})}^{Diagonal}$$ (A67)

$$P_{(n-n_{EUL})\times 1}(t+TTI|t) = A_{(n-n_{EUL})\times(n-n_{EUL})}^{Diagonal} P_{(n-n_{EUL})\times 1}(t|t)A$$ (A68)

$$P_{n_{EUL}\times n_{EUL}}(t+T_{Min}|t) = A_{n_{EUL}\times n_{EUL}}^{Diagonal} P_{n_{EUL}\times n_{EUL}}^{Diagonal}(t|t) \\ A_{n_{EUL}\times n_{EUL}}^{Diagonal} + R_{1,n_{EUL}\times n_{EUL}}^{Diagonal}$$ (A69)

$$P_{n_{EUL}\times 1}(t+TTI|t) = A_{n_{EUL}\times n_{EUL}}^{Diagonal} P_{n_{EUL}\times 1}(t|t)A$$ (A70)

$$P(t+TTI|t) = AP(t|t)A + R$$ (A71)

The complexity becomes approximately:

$$CovariancePredictionComplexity \approx \frac{5n + n_{EUL}^2}{TTI} FLOPs.$$ (A72)

Complexity of the Complexity Reduced Kalman Filter

When the complexities of each of the five main equations of the Kalman filter are summed up, the end result becomes:

$$KalmanFilterComplexity \approx \frac{3n^2 + 0.5nn_{EUL}^2 + 20n + 2.5n_{EUL}^3}{TTI} FLOPs.$$ (A73)

REFERENCES

[1] T. Söderström, Discrete Time Stochastic Systems. London, UK: Springer, 2002, pp. 12-14, 123-126, 142, 149-150, 247.

The invention claimed is:

1. A method for estimating powers in a cellular communications system, comprising the steps of:
   measuring instantaneous values of a number, m+1, of signal powers at a plurality of time instances, where m>1; and,
   determining an estimate of said powers based on said measured instantaneous values of signal powers;
   wherein said determining step comprises a repetition of a processing step, utilizing n+1 state variables representing said powers to be estimated, where n>1;
   wherein said n+1 state variables are dependent on said measured instantaneous values of signal powers as well as on a first interdependency matrix of dimension (n+1)×(m+1) relating to said n+1 state variables and to estimation errors between said measured instantaneous values of signal powers and said estimated powers;
   wherein said processing step comprises the step of creating a zero pattern in said first interdependency matrix used in said processing step, in turn comprising the step of setting interdependencies between a state variable and an estimation error related to two different channels, both fulfilling a first criterion, to zero; and,
   wherein said first criterion is based on available bit rate for said channel.

2. The method according to claim 1, wherein said signal powers are selected from the group of a channel power and a total power, and said powers to be estimated are selected from the group of a channel power, a total power and a sum of neighbour cell interference power and thermal noise power.

3. The method according to claim 1, wherein said first interdependency matrix is a gain matrix.

4. The method according to claim 1, wherein said estimation errors between said measured instantaneous values of signal powers and said estimated powers, on which said first interdependency matrix is related, are expressed in terms of state variable covariances obtained from a second interdependency matrix of dimension (n+1)×(n+1) relating to said n+1 state variables.

5. The method according to claim 4, wherein said second interdependency matrix is a covariance matrix.

6. The method according to claim 4, wherein said processing step comprises the step of creating a zero pattern in said second interdependency matrix, in turn comprising the step of setting interdependencies between state variables related to two different channels, both fulfilling said first criterion, to zero.

7. The method according to claim 1, wherein said first criterion is fulfilled if said available bit rate is lower than a first threshold.

8. The method according to claim 7, wherein said first threshold is higher than an available bitrate for any single voice channel of said cellular communications system.

9. The method according to claim 1, wherein said step of creating a zero pattern in said first interdependency matrix further comprises the step of setting interdependencies between a state variable and an estimation error related to two different channels, of which a first channel fulfils said first criterion and a second channel not fulfilling said first criterion but fulfils a second criterion, to zero.

10. The method according to claim 9, wherein said step of creating a zero pattern in said second interdependency matrix further comprises the step of setting covariances between state variables related to two different channels, of which a first channel fulfils said first criterion and a second channel not fulfilling said first criterion but fulfils a second criterion, to zero.

11. The method according to claim 9, wherein said second criterion is based on available bit rate for said channel.

12. The method according to claim 11, wherein said second criterion is fulfilled if said available bit rate is lower than a second threshold.

13. The method according to claim 12, wherein said second threshold is higher than an available bitrate for any single channel of said cellular communications system.

14. The method according to claim 1, wherein said step of determining comprises a Kalman filtering, whereby said processing step comprises a cycle of said Kalman filtering.

15. The method according to claim 1, wherein m=n.

16. An arrangement for estimating powers in a cellular communications system, comprising:
   means for obtaining measured instantaneous values of a number, m+1, of signal powers at a plurality of time instances, where m>1; and,
   means for determining an estimate of said powers based on said measured instantaneous values of signal powers, connected to said means for obtaining measured instantaneous values of signal powers;
   wherein said means for determining an estimate of said powers comprises means for repeating a processing procedure, utilizing n+1 state variables representing said powers to be estimated, where n>1;
   wherein said n+1 state variables are dependent on said measured instantaneous values of signal powers as well as on a first interdependency matrix of dimension (n+1)×(m+1) relating to said n+1 state variables and to estimation errors between said measured instantaneous values of signal powers and said estimated powers;

wherein said processing procedure comprises the step of creating a zero pattern in said first interdependency matrix used in said processing procedure, in turn comprising setting of interdependencies between a state variable and an estimation error related to two different channels, both fulfilling a first criterion, to zero; and, wherein said first criterion is based on available bit rate for said channel.

17. The arrangement according to claim 16, wherein said signal powers are selected from the group of a channel power and a total power, and said powers to be estimated are selected from the group of a channel power, a total power and a sum of neighbour cell interference power and thermal noise power.

18. The arrangement according to claim 16, wherein said first interdependency matrix is a gain matrix.

19. The arrangement according to claim 16, wherein said means for determining an estimate of said powers is arranged to express said estimation errors between said measured instantaneous values of signal powers and said estimated powers, on which said first interdependency matrix is related, in terms of state variable covariances obtained from a second interdependency matrix of dimension (n+1)×(n+1) relating to said n+1 state variables.

20. The arrangement according to claim 19, wherein said second interdependency matrix is a covariance matrix.

21. The arrangement according to claim 19, wherein said processing procedure comprises creating of a zero pattern in said second interdependency matrix, in turn comprising setting of interdependencies between state variables related to two different channels, both fulfilling said first criterion, to zero.

22. The arrangement according to claim 16, wherein said first criterion is fulfilled if said available bit rate is lower than a first threshold.

23. The arrangement according to claim 22, wherein said first threshold is higher than an available bitrate for any single voice channel of said cellular communications system.

24. The arrangement according to claim 16, wherein said means for determining an estimate of said powers is arranged to perform said creating of a zero pattern in said first interdependency matrix by further setting of interdependencies between a state variable and an estimation error related to two different channels, of which a first channel fulfils said first criterion and a second channel not fulfilling said first criterion but fulfils a second criterion, to zero.

25. The arrangement according to claim 24, wherein said means for determining an estimate of said powers is arranged to perform said creating of a zero pattern in said second interdependency matrix by further setting covariances between state variables related to two different channels, of which a first channel fulfils said first criterion and a second channel not fulfilling said first criterion but fulfils a second criterion, to zero.

26. The arrangement according to claim 24, wherein said second criterion is based on available bit rate for said channel.

27. The arrangement according to claim 26, wherein said second criterion is fulfilled if said available bit rate is lower than a second threshold.

28. The arrangement according to claim 27, wherein said second threshold is higher than an available bitrate for any single channel of said cellular communications system.

29. The arrangement according to claim 16, wherein said means for determining an estimate of said powers comprises a Kalman filter arrangement, whereby said processing procedure comprises a cycle of said Kalman filter arrangement.

30. The method according to claim 16, wherein m=n.

31. The arrangement according to claim 16, wherein said means for obtaining measured instantaneous values of signal powers comprises means for measuring said instantaneous values of signal powers.

32. The arrangement according to claim 16, wherein said means for obtaining measured instantaneous values of signal powers comprises means for receiving measured instantaneous values of signal powers.

* * * * *

UNITED STATES PATENT AND TRADEMARK OFFICE
CERTIFICATE OF CORRECTION

| | | |
|---|---|---|
| PATENT NO. | : 7,912,461 B2 | Page 1 of 3 |
| APPLICATION NO. | : 12/091833 | |
| DATED | : March 22, 2011 | |
| INVENTOR(S) | : Wigren | |

It is certified that error appears in the above-identified patent and that said Letters Patent is hereby corrected as shown below:

In Column 9; Lines 18-22, in Equation (A8)

Delete "
$$= \begin{pmatrix} D_{(n-n_{EUL})}(P(t|t-T_{Min})) \\ 0 \\ (P_{(n-n_{EUL})\times 1}(t|t-T_{Min}))^T \end{pmatrix}$$
"

and Insert --
$$= \begin{pmatrix} \mathbf{D}_{(n-n_{EUL})\times(n-n_{EUL})}(\mathbf{P}(t|t-T_{Min})) \\ 0 \\ \left(\mathbf{P}_{(n-n_{EUL})\times 1}(t|t-T_{Min})\right)^T \end{pmatrix}$$
--, therefor In Column 11; Lines 1-4, in Equation (A20)

Delete "
$$\begin{pmatrix} Q_{(n-n_{EUL})\times(n-n_{EUL})}(t) & 0 & Q'_{(n-n_{EUL})\times 1}(t) & I_{(n-n_{EUL})\times(n-n_{EUL})} & 0 & 0 \\ 0 & Q_{n_{EUL}\times n_{EUL}}(t) & Q_{n_{EUL}\times 1}(t) & 0 & I_{n_n\_EUL\times n_{EUL}} & 0 \\ (Q_{(n-n_{EUL})\times 1}(t))^T & (Q_{n_{EUL}\times 1}(t))^T & Q(t) & 0 & 0 & 1 \end{pmatrix}$$
"

Signed and Sealed this
Twenty-seventh Day of March, 2012

David J. Kappos
*Director of the United States Patent and Trademark Office*

CERTIFICATE OF CORRECTION (continued)
U.S. Pat. No. 7,912,461 B2 and Insert $$-- \begin{pmatrix} \mathbf{Q}^{Diagonal}_{(n-n_{EUL})\times(n-n_{EUL})}(t) & 0 & \mathbf{Q}'_{(n-n_{EUL})\times 1}(t) & \mathbf{I}_{(n-n_{UE})\times(n-n_{EUL})} & 0 & 0 \\ 0 & \mathbf{Q}_{n_{EUL}\times n_{EUL}}(t) & \mathbf{Q}_{n_{EUL}\times 1}(t) & 0 & \mathbf{I}_{n_{EUL}\times n_{EUL}} & 0 \\ \left(\mathbf{Q}'_{(n-n_{EUL})\times 1}(t)\right)^T & \left(\mathbf{Q}_{n_{EUL}\times 1}(t)\right)^T & \underline{Q}(t) & 0 & 0 & 1 \end{pmatrix} --, \text{ therefor.}$$

In Column 13; Line 17, in Equation (A25)

Delete " $P(t \mid t - T_{Min})C^T(t) ==$ ,"

and Insert -- $\mathbf{P}(t \mid t - T_{Min})\mathbf{C}^T(t) =$ --, therefor.

In Column 14; Lines 52-55, in Equation (A37)

Delete "$T_{n_{EUL}\times(n-n_{EUL})}(t) = S_{n_{EUL}\times n_{EUL}}(t)(Q_{(n-n_{EUL})\times n_{EUL}}^{-1}(t))^T + S_{n_{EUL}\times 1}(t)Q_{(n-n_{EUL})\times 1}^{-1}(t))$"

and Insert $$-- \mathbf{T}_{n_{EUL}\times(n-n_{EUL})}(t) = \mathbf{S}_{n_{EUL}\times n_{EUL}}(t)\left(\mathbf{Q}^{-1}_{(n-n_{EUL})\times n_{EUL}}(t)\right)^T + \mathbf{S}_{n_{EUL}\times 1}(t)\left(\mathbf{Q}^{-1}_{(n-n_{EUL})\times 1}(t)\right)^T --, \text{ therefor.}$$

In Column 15; Lines 1-5, in Equation (A43)

Delete "$\begin{pmatrix} D_{(n-n_{EUL})\times(n-n_{EUL})}(T(t)) & 0 \\ 0 & T_{n_{EUL}\times n_{EUL}}(t) \\ T_{1\times(n-n_{EUL})}(t) & T_{1\times n_{EUL}}(t) \end{pmatrix}$"

and Insert -- $\begin{pmatrix} \mathbf{D}_{(n-n_{EUL})\times(n-n_{EUL})}(\mathbf{T}(t)) & 0 \\ 0 & \mathbf{T}_{n_{EUL}\times n_{EUL}}(t) \\ \mathbf{T}_{1\times(n-n_{EUL})}(t) & \mathbf{T}_{1\times n_{EUL}}(t) \end{pmatrix}$ --, therefor.

CERTIFICATE OF CORRECTION (continued)
U.S. Pat. No. 7,912,461 B2

In Column 16; Lines 63-66, in Equation (A55)

Delete "$\begin{pmatrix} D_{(n-n_{EUL}) \times (n-n_{EUL})} T(t)) \\ 0 \\ T_{1 \times (n-n_{EUL})}(t) \end{pmatrix}$"

and Insert -- $= \begin{pmatrix} \mathbf{D}_{(n-n_{EUL}) \times (n-n_{EUL})}(\mathbf{T}(t)) \\ 0 \\ \mathbf{T}_{1 \times (n-n_{EUL})}(t) \end{pmatrix}$ --, therefor.

In Column 22, Line 28, in Claim 30, delete "method" and insert -- arrangement --, therefor.